US007936232B2

(12) United States Patent
Song et al.

(10) Patent No.: US 7,936,232 B2
(45) Date of Patent: May 3, 2011

(54) SUBSTRATE FOR SEMICONDUCTOR PACKAGE

(75) Inventors: Eun-seok Song, Gwanak-gu (KR); Hee-seok Lee, Yongin-si (KR); So-young Lim, Yongin-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 12/824,415

(22) Filed: Jun. 28, 2010

(65) Prior Publication Data

US 2010/0264524 A1 Oct. 21, 2010

Related U.S. Application Data

(63) Continuation of application No. 11/761,416, filed on Jun. 12, 2007, now Pat. No. 7,760,044.

(30) Foreign Application Priority Data

Jun. 13, 2006 (KR) ........................ 10-2006-0053114

(51) Int. Cl.
*H04B 3/28* (2006.01)

(52) U.S. Cl. .................... 333/12; 343/700 MS; 343/909

(58) Field of Classification Search .................. 333/185, 333/161, 12, 246; 257/660, 774, 773, E23.115, 257/E23.169, E23.011; 343/909, 700 MS
See application file for complete search history.

(56) References Cited

U.S. PATENT DOCUMENTS 3,736,534 A 5/1973 Chaffee
4,949,057 A 8/1990 Ishizaka et al.
5,030,932 A 7/1991 Kameya
5,365,203 A 11/1994 Nakamura et al.
5,453,751 A 9/1995 Tsukamoto et al.
5,495,213 A 2/1996 Ikeda
6,292,154 B1 9/2001 Deguchi et al.
6,359,237 B1 3/2002 Tohya et al.
6,522,222 B1 * 2/2003 Pchelnikov et al. .......... 333/161
6,823,268 B2 2/2005 Harada
7,136,028 B2 * 11/2006 Ramprasad et al. .......... 343/909
7,141,883 B2 * 11/2006 Wei et al. ...................... 257/778
7,434,306 B2 * 10/2008 Gardner ....................... 29/602.1
2004/0041668 A1 * 3/2004 Mikami et al. ................ 333/204
2005/0247999 A1 * 11/2005 Nishikawa et al. ........... 257/531

FOREIGN PATENT DOCUMENTS

JP 10-125721 5/1998
JP 2004-087860 3/2004
KR 1020050035043 A 4/2005

* cited by examiner

*Primary Examiner* — Rexford N Barnie
*Assistant Examiner* — Crystal L Hammond
(74) *Attorney, Agent, or Firm* — Volentine & Whitt, P.L.L.C.

(57) ABSTRACT

A substrate for a semiconductor package includes a dielectric substrate, a circuit pattern formed on a first surface of the dielectric substrate, and an electromagnetic band gap (EGB) pattern. The EGB pattern includes multiple unit structures formed on a second surface of the dielectric substrate, where each unit structure includes a flat conductor electrically connected to the circuit pattern through a ground connection, and multiple spiral-patterned conductors electrically connected to the flat conductor. The second surface is formed on an opposite side of the dielectric substrate from the first surface. Each flat conductor is electrically connected to a flat conductor of another one of the unit structures. At least one of the spiral-patterned conductors in each one of the unit structures is electrically connected to another one of the spiral-patterned conductors.

13 Claims, 8 Drawing Sheets

SUBSTRATE FOR SEMICONDUCTOR PACKAGE

CROSS-REFERENCE TO RELATED APPLICATIONS

This application is a continuation application of application Ser. No. 11/761,416, filed on Jun. 12, 2007, which is hereby incorporated for all purposes.

BACKGROUND OF THE INVENTION

1. Field of the Invention

Embodiments of the invention relate generally to substrates for semiconductor packages. More particularly, embodiments of the invention relate to substrates capable of significantly reducing electromagnetic interference (EMI).

A claim of priority is made to Korean Patent Application No. 10-2006-0053114, filed on Jun. 13, 2006, the disclosure of which is hereby incorporated by reference in its entirety.

2. Description of Related Art

In recent years, electronic devices such as mobile information terminals, cellular telephones, liquid crystal display panels, and notebook computers have continued to get smaller, thinner, and lighter. At the same time, the size and performance of various components within these electronic devices have been adjusted accordingly. For example, semiconductor devices within the electronic devices have become smaller, lighter, and increasingly integrated.

As these electronic devices have become thinner, smaller, and more dense, the use of tape wiring substrates has become increasingly common in the field of semiconductor chip mounting technology. Tape wiring substrates typically have a structure in which a wiring pattern layer and leads connected thereto are formed on a thin film of insulating material such as polyimide resin.

Unfortunately, these electronic devices tend to generate electromagnetic waves that can cause disruptions in other electronic devices, and in some cases, can even be harmful to human bodies. In view of these potential problems, governments and other public institutions have developed regulations to govern so-called “electromagnetic interference” (EMI) caused by the emission of electromagnetic waves by electronic devices.

Typically, the term “EMI” is used to refer to undesired interactions between high-frequency noise generated by electronic circuits or systems and neighboring circuits, systems, or human bodies. In many countries, products are required to pass tests to verify that they meet prescribed EMI emission standards before they can be released to the public.

One conventional approach to regulating the amount of EMI emitted by an electronic device is to form a flat conductor on a printed circuit board within the device, wherein the flat conductor is connected between one or more circuits and ground. The purpose of the flat conductor is to shunt at least some of the emitted EMI to ground to prevent the EMI from adversely affecting the device’s surroundings.

Unfortunately, however, this conventional approach may fail to sufficiently reduce the EMI and could benefit from enhancement in several aspects.

SUMMARY OF THE INVENTION

According to one embodiment of the invention, a substrate for a semiconductor package comprises a dielectric substrate, a circuit pattern, and an electromagnetic band gap (EBG) pattern. The circuit pattern is formed on a first surface of the dielectric substrate and is connected to ground via a ground connection. The electromagnetic band gap (EBG) pattern comprises a plurality of zigzag unit structures formed on a second surface of the dielectric substrate, wherein the second surface is formed on an opposite side of the dielectric substrate from the first surface; the zigzag unit structures are electrically connected to each other; and at least one of the zigzag unit structures is electrically connected to the ground connection.

According to another embodiment of the invention, a substrate for a semiconductor package comprises a stacked dielectric body, a plurality of circuit patterns, and an electromagnetic band gap (EBG) pattern. The stacked dielectric body comprises a plurality of dielectric substrates stacked on each other. The plurality of circuit patterns are formed on at least one of a first surface of the stacked dielectric body, a second surface of the stacked dielectric body, and one or more interface surfaces located at one or more interfaces between adjacent dielectric substrates among the plurality of dielectric substrates, and each of the circuit patterns is connected to ground via a ground connection. The electromagnetic band gap (EBG) pattern comprises a plurality of zigzag unit structures formed on at least one of the first surface, the second surface, and the one or more interface surfaces. Each of the zigzag unit structures comprises a conductor comprising a plurality of zigzag patterns each having portions arranged in two opposing directions, wherein the zigzag patterns are electrically connected to each other, and wherein at least one of the zigzag unit structures is electrically connected to the ground connection.

BRIEF DESCRIPTION OF THE DRAWINGS

Embodiments of the invention are described below in relation to the accompanying drawings. Throughout the drawings like reference numbers indicate like exemplary elements, components, and steps. In addition, various elements and regions in the drawings are drawn in a schematic manner and selected proportions and dimensions of various features are exaggerated for clarity of illustration. In the drawings.

DESCRIPTION OF EXEMPLARY EMBODIMENTS

Exemplary embodiments of the invention are described below with reference to the corresponding drawings. These embodiments are presented as teaching examples. The actual scope of the invention is defined by the claims that follow.

In the description that follows, features such as layers may be described as being formed "on" other features such as layers or substrates; however, where this or similar expressions are used to describe the relative positions of features, it should be understood that the features may be in direct contact with each other, or intervening features may also be present.

Figure 1A:
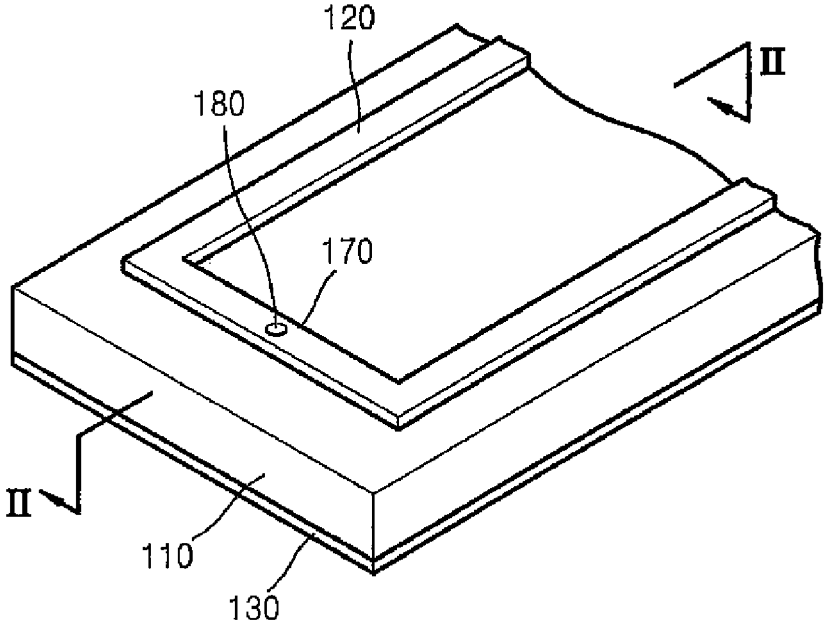
FIG. 1A is a perspective view illustrating a substrate for a semiconductor package according to an embodiment of the present invention.
Figure 1B:
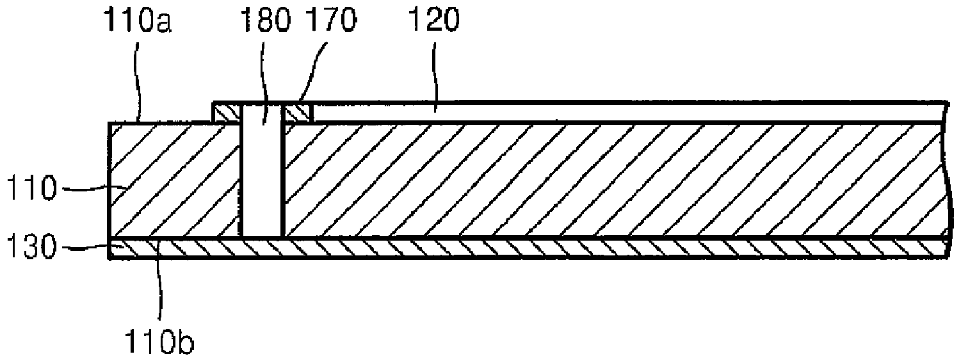
FIG. 1B is a cross-sectional view taken along a line II-II in the substrate shown in FIG. 1A.

FIG. 1A is a perspective view illustrating a substrate for a semiconductor package according to an embodiment of the present invention and FIG. 1B is a cross-sectional view taken along a line II-II in the substrate of FIG. 1A.

Referring to FIGS. 1A and 1B, the substrate comprises a dielectric substrate 110, and a circuit pattern 120 formed on a first surface 110*a* of dielectric substrate 110 and connected to ground via a ground connection 170. The substrate further comprises an electromagnetic band gap (EBG) pattern 130 including a plurality of zigzag unit structures formed on a second surface 110*b* of the dielectric substrate formed opposite first surface 110*a*. EBG pattern 130 is connected to ground connection 170 by way of a via 180 extending through dielectric substrate 110.

Zigzag unit structures each comprise a conductor forming a zigzag pattern. Typically, each of the plurality of zigzag unit structures is connected to the other of the plurality of zigzag unit structures and at least one of the plurality of zigzag unit structures is connected to ground connection 170. Examples of various different types of zigzag unit structures are shown in FIGS. 2A through 2F. In particular FIGS. 2A through 2F illustrate zigzag unit structures labeled 100*a* through 100*f*, respectively.

Figure 2A:
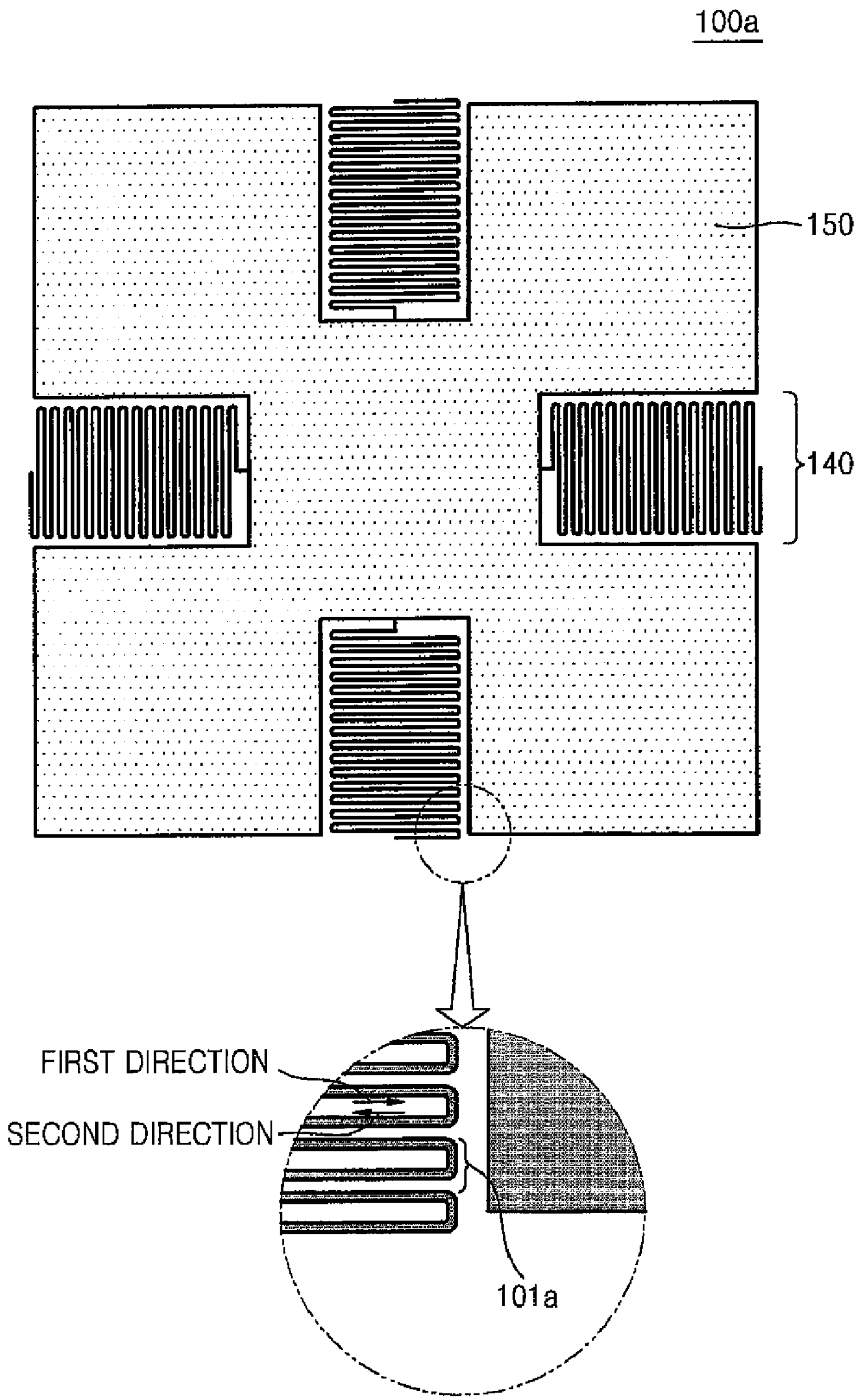
FIGS. 2A through 2F are conceptual diagrams illustrating a zigzag unit structure according to an embodiment of the present invention.

Referring to FIGS. 2A through 2F, each zigzag unit structure comprises a plurality of zigzag patterns 101*a* repeated two or more times. In other words, the term "zigzag unit structure" in the present context refers to a structure including at least two of patterns 101*a*, as viewed from a two-dimensional perspective. Where patterns 101*a* are analyzed from a two-dimensional perspective, each of patterns 101*a* can be considered to have a first direction and a second direction. The first and second directions are illustrated, for example, in FIG. 2A. In FIG. 2A, the first and second directions are oriented at angles of 180° with respect to each other. However, this angle could be modified in various embodiments of the invention.

In each zigzag unit structure 100, the number of patterns 101*a* is preferably between 5 and 1000. On one hand, including less than five patterns 101*a* tends to be less effective for removing EMI. On the other hand, including more than one thousand patterns 101*a* can make it difficult to fabricate zigzag unit structure, and easier to produce defects in zigzag unit structure.

Referring to FIG. 2A, zigzag unit structure 100*a* comprises four meander structures 140 formed in predetermined regions on four sides of a flat square conductor 150 near the center of a conductor. In zigzag unit structure 100*a*, patterns 101*a* are arranged in the first and second directions at angles of 180° with respect to each other.

Figure 2B:
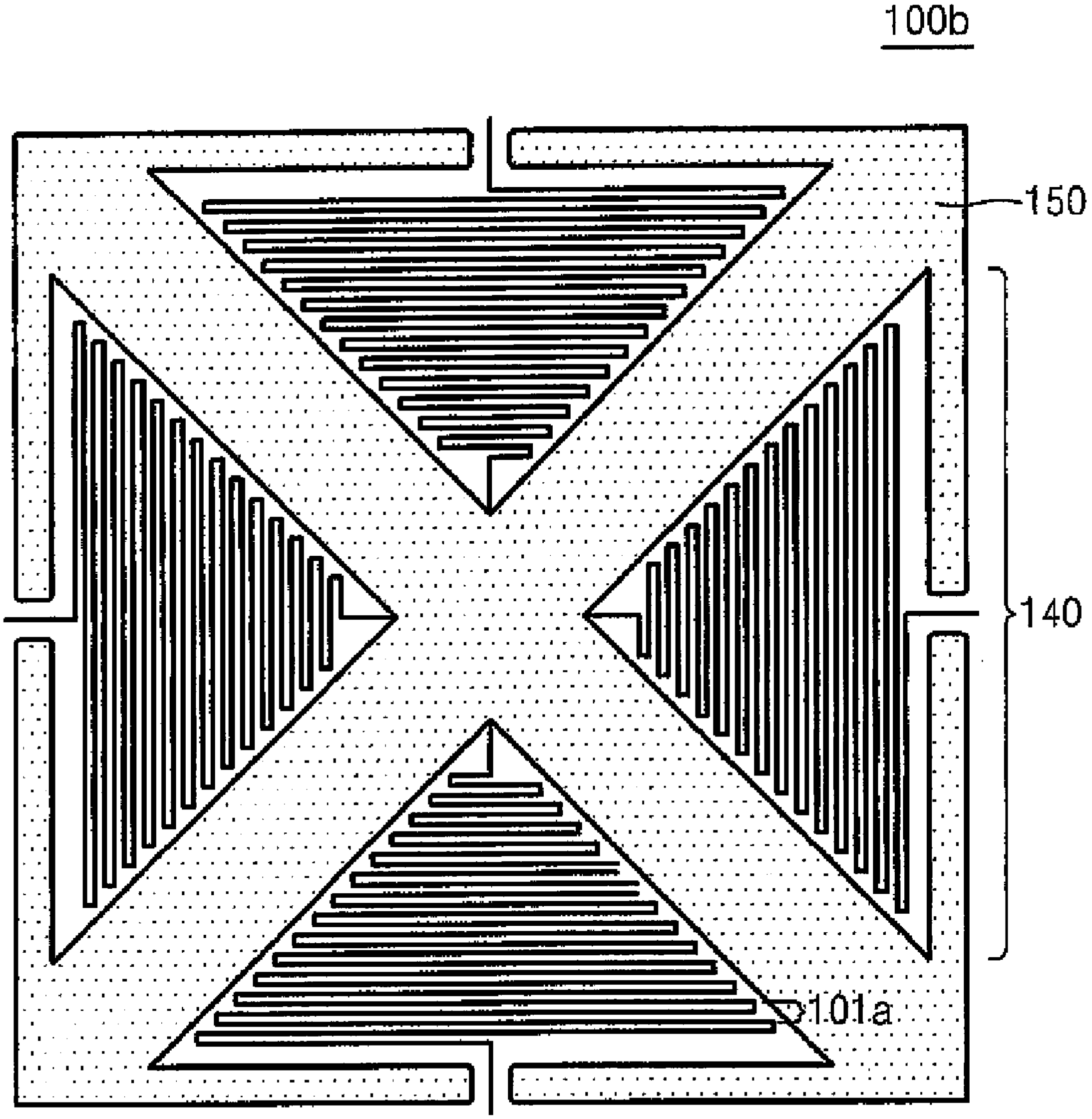
Figure 2C:
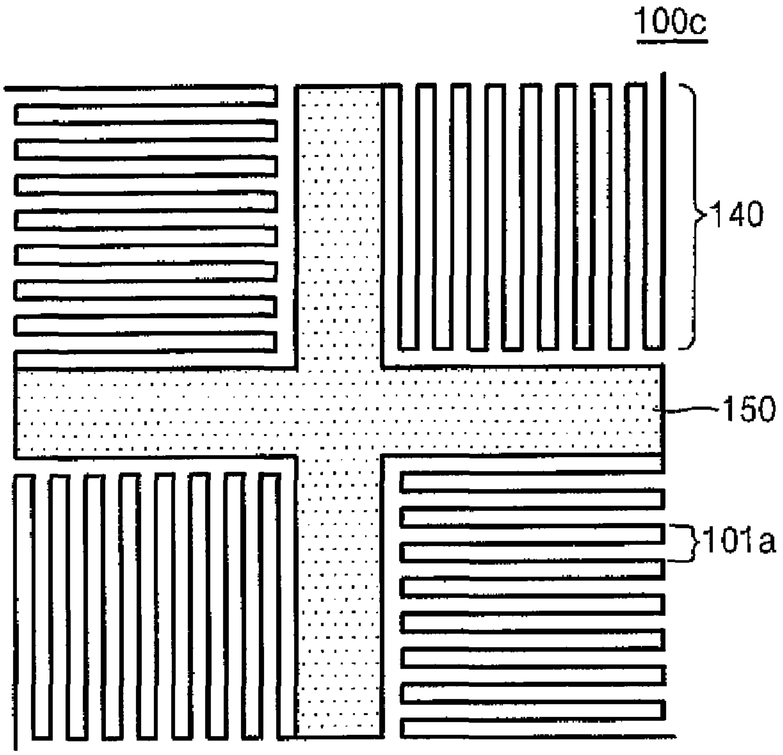

Referring to FIG. 2B, zigzag unit structure 100*b* comprises meander structures 140 similar to those of FIG. 2A formed in four sides of flat square conductor 150. Referring to FIG. 2C, zigzag unit structure 100*c* also comprises meander structures 140 similar to those of FIG. 2A formed in four corner regions of flat square conductor 150.

In FIGS. 2A through 2C, zigzag unit structures 100*a*, 100*b*, and 100*c* each comprise rectilinear shapes repeated in various directions. That is, each of zigzag unit structures 100*a*, 100*b*, and 100*c* comprises patterns repeated in the x-direction, the y-direction, or the x-direction and the y-direction. Since the capacitance of EBG pattern 130 is related to the physical size of zigzag unit structure, the particular pattern zigzag unit structure may be selected in consideration of its size, and also the size of the substrate.

Zigzag unit structures 100*a* through 100*c* may be formed using similarly shaped meander structures 140 or differently shaped meander structures 140 based on electromagnetic properties of the substrate and related circuits.

Figure 2D:
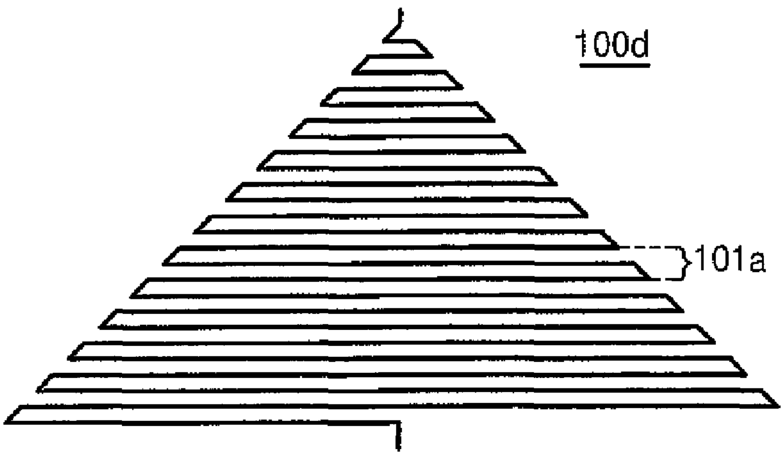
Figure 2E:
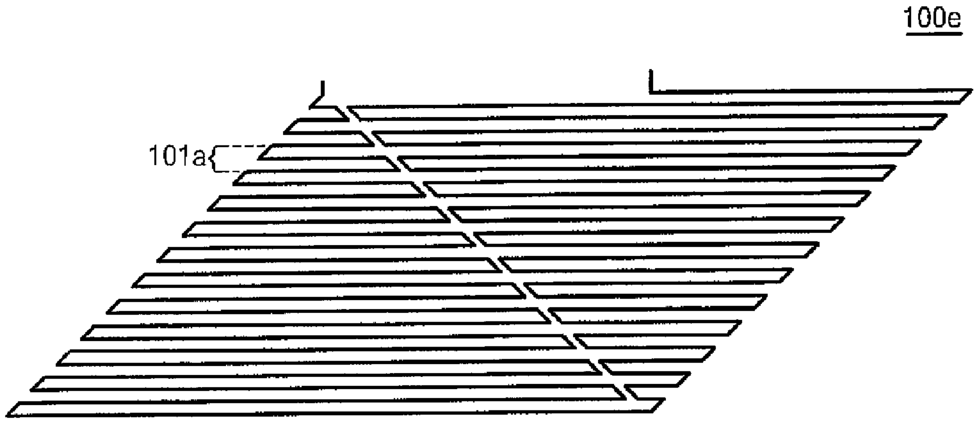

Referring to FIG. 2D, zigzag unit structure 100*d* has a triangular shape. Referring to FIG. 2E, zigzag unit structure 100*e* comprises two juxtaposed zigzag unit structures 100*d*.

Zigzag unit structure 100*d* may yield a variety of EBG patterns having different connection relationships and juxtapositions such as zigzag unit structure 100*e*.

Figure 2F:
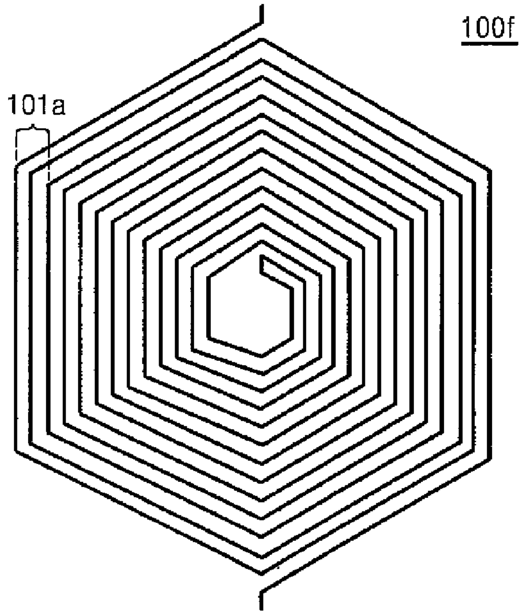

Referring to FIG. 2F, zigzag unit structure 100*f* has a hexagonal shape. Zigzag unit structure 100*f* comprises patterns 101*a* repeated in three directions to provide excellent EMI shielding performance.

Dielectric substrate 110 typically comprises a conventional nonconductive substrate. However, in a flexible tape substrate, dielectric substrate 110 may be formed of a flexible nonconductive polymer material. The flexible nonconductive polymer material may comprise, for example, polyimide resin, or other materials known to those skilled in the art.

Circuit pattern 120 is typically formed using a conventional method chosen based on the purpose or function of circuit pattern 120. In addition, the substrate is also typically fabricated using a conventional method.

Figure 3:
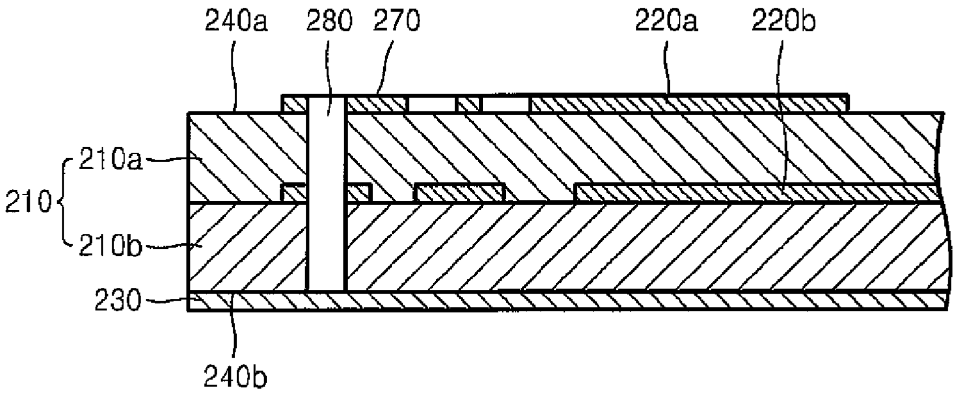
FIG. 3 is a cross-sectional view illustrating a substrate for a semiconductor package according to another embodiment of the present invention.

FIG. 3 is a cross-sectional view of a substrate for a semiconductor package according to another embodiment of the invention. Referring to FIG. 3, the substrate comprises a stacked dielectric body 210 comprising a plurality of dielectric substrates 210*a* and 210*b*. Stacked dielectric body 210 comprises a first surface 240*a*, a second surface 240*b*, and an interface surface located at an interface between dielectric substrates 210*a* and 210*b*. The substrate further comprises circuit patterns 220*a* and 220*b* formed on first surface 240*a* and the interface surface, respectively, an EGB pattern 230 formed on second surface 240*a*, a ground connection 270 connected to circuit patterns 220*a* and 220*b*, and a via 280 penetrating stacked dielectric body 210 and connected between ground connection 270 and EGB pattern 230.

As seen in FIG. 3, portions of ground connection 270 and circuit patterns 220*b* are located at an interface between dielectric substrates 210*a* and 210*b*. EBG pattern 230 comprises a plurality of zigzag unit structures formed on at least one of first surface 240*a*, second surface 240*b*, and the interface surface.

The substrate of FIG. 3 can be modified to include "N" dielectric substrates in stacked dielectric body 210. In such a substrate, the total number of surfaces in stacked dielectric body 210, including first surface 240*a*, second surface 240*b*, and all interface surfaces will be equal to N+1. In addition, at least one of the (N+1) surfaces including the circuit pattern 220*a* or 220*b* will be connected to ground connection 270. Further, at least one of the (N+1) surfaces will further include an EBG pattern having a plurality of zigzag unit structures.

In some embodiments of the invention, an EBG pattern is formed only on one of first surface 240*a*, second surface 240*b*, or the interface surfaces of stacked dielectric body 210 to shield electromagnetic interference only in one direction.

The substrate of FIG. 3 can use zigzag unit structures and EBG patterns similar to those illustrated in FIGS. 2A-2F. In addition, the substrate illustrated in FIG. 3 is typically fabricated using conventional methods.

Figure 4:
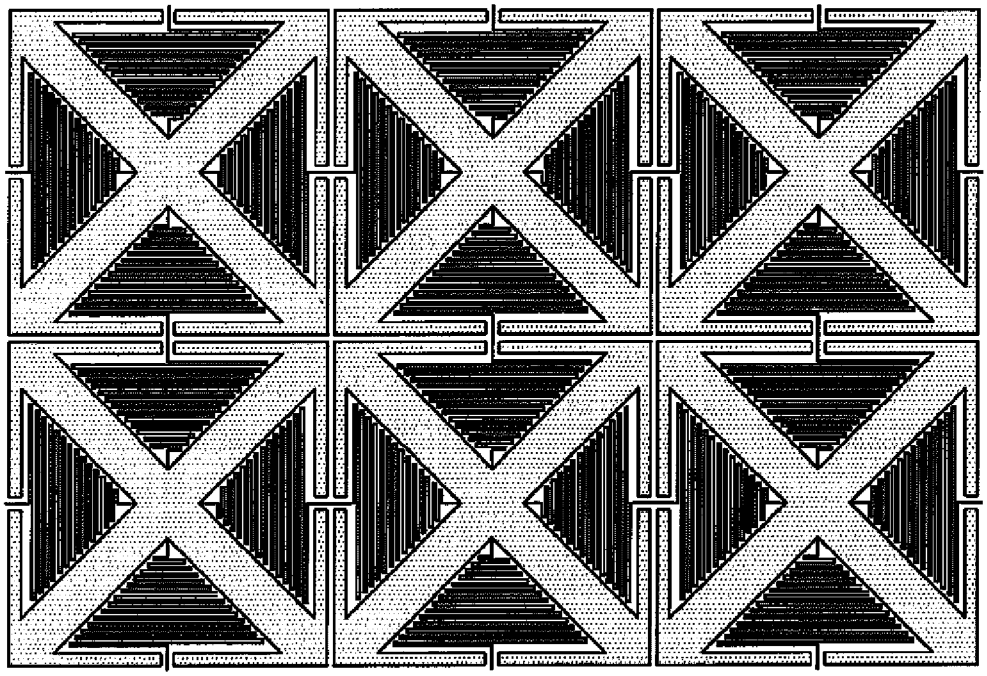
FIG. 4 is a perspective view illustrating an EBG pattern according to an embodiment of the present invention.

FIG. 4 is a perspective view illustrating a substrate for a semiconductor package according to another embodiment of the invention. Referring to FIG. 4, the substrate comprises a plurality of zigzag unit structures 100*b* arranged adjacent to each other.

Experiments were performed to measure the electromagnetic interference shielding effect of various substrates for semiconductor packages according to selected embodiments of the invention.

Semiconductor package substrates having EBG patterns including zigzag unit structures 100*a* and 100*b*, were fabricated and then the electromagnetic wave shielding capability of the structures was measured at various operation frequencies. Results of the measurements for structures 100*a* and 100*b* are shown in FIGS. 5A and 5B, respectively.

Figure 5A:
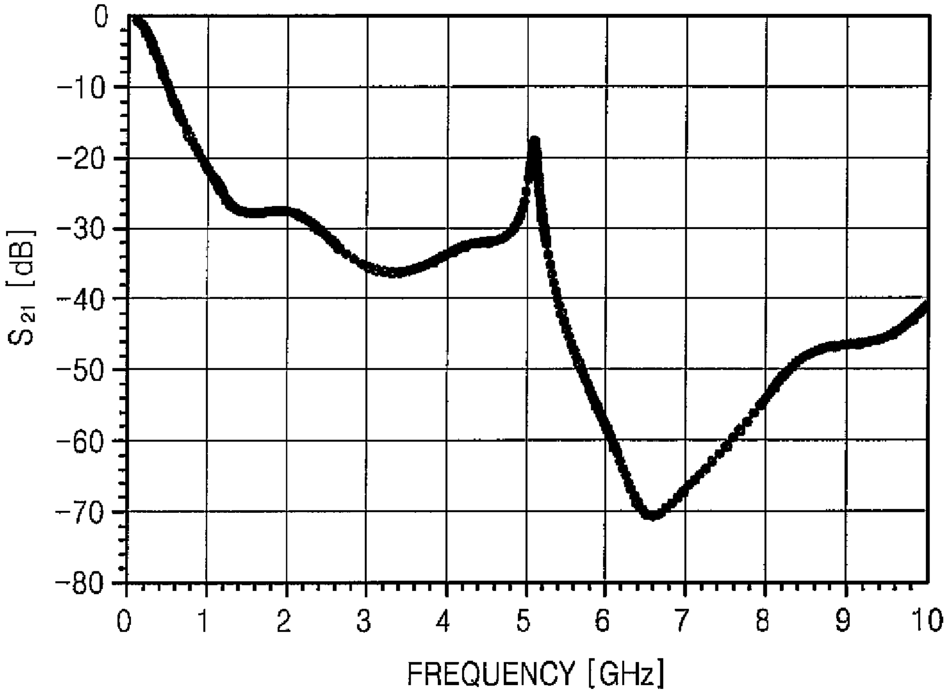
FIGS. 5A and 5B are graphs illustrating results obtained when testing the electromagnetic-wave shielding performance of an EBG pattern according to an embodiment of the present invention.
Figure 5B:
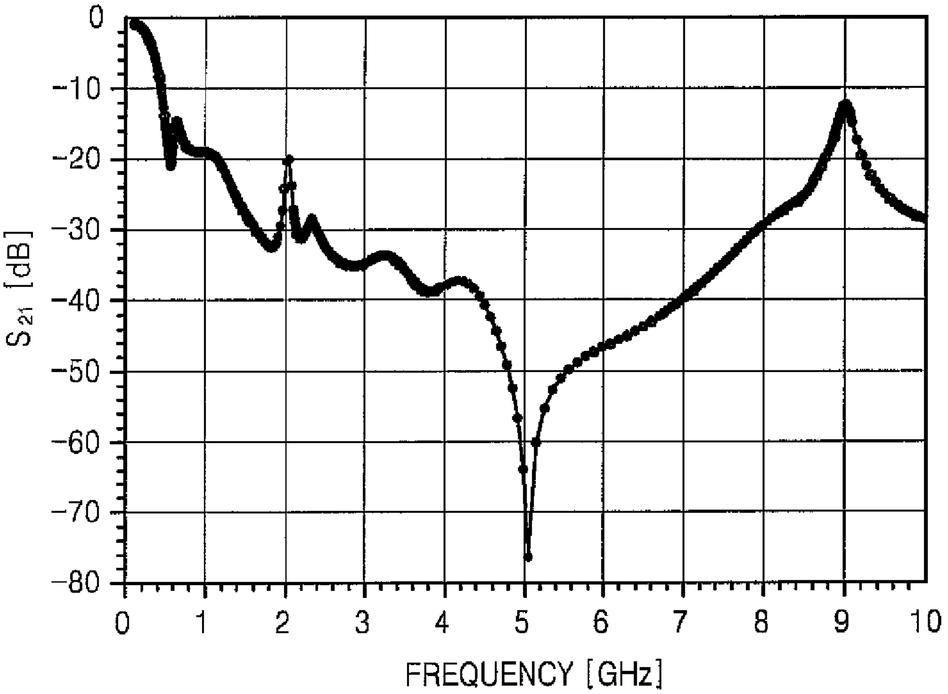

In FIGS. 5A and 5B, the frequency of input signals on circuit patterns in the substrates is measured on the x-axis, and the magnitude of detected electromagnetic-wave emission of the substrates is measured on the y-axis. In other words, electromagnetic-wave emission is plotted as a function of input signal frequency. The electromagnetic-wave emission is plotted on a log scale. Accordingly, values of electromagnetic-wave emission $S_{21}$ closer to zero indicate lower electromagnetic-wave shielding capability by the substrates and values of EMI emission $S_{21}$ further from zero indicate higher electromagnetic-wave shielding capability by the substrates.

As seen in FIGS. 5A and 5B, substrates according to selected embodiments of the invention are relatively good at shielding electromagnetic-waves generated by high-frequency input signals.

Figure 6A:
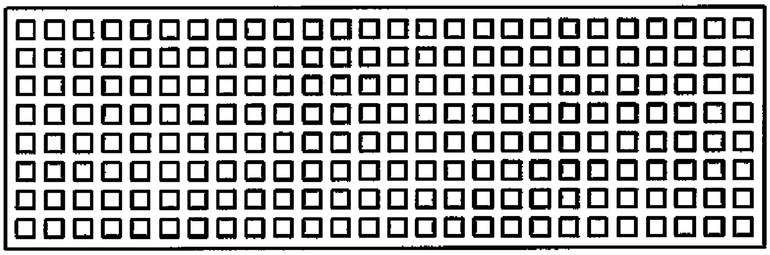
FIG. 6A illustrates a conventional EBG pattern.

FIG. 6A illustrates a conventional substrate for a semiconductor package including a conductor pattern having a mesh structure. The electromagnetic-wave emission of the conventional substrate in FIG. 6A is illustrated in FIG. 6B.

Figure 6B:
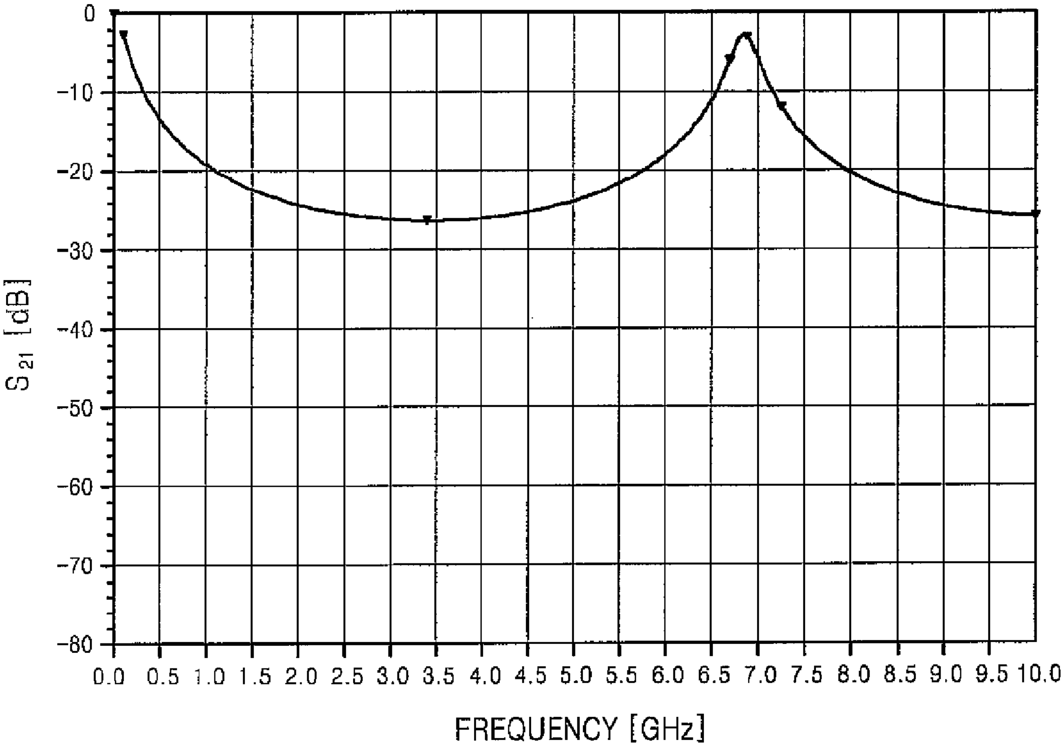
FIG. 6B is a graph illustrating a result obtained when testing the electromagnetic-wave shielding performance using the EBG pattern of FIG. 6A.

Comparing FIG. 6A with FIGS. 5A and 5B, it can be seen that the electromagnetic-wave emission $S_{21}$ in FIG. 6B has a minimum value at about 3.4 GHz while the electromagnetic wave emission $S_{21}$ in FIGS. 5A and $S_{21}$ in FIG. 5B have minimum values at about 6.6 GHz and 5 GHz, respectively. In addition, while the minimum value of $S_{21}$ in FIG. 6B is only about −26 dB, the minimum value of $S_{21}$ in FIGS. 5A and 5B ranges from −70 to −80 dB. In other words, substrates according to selected embodiments of the invention exhibit superior electromagnetic-wave shielding capability at higher frequencies compared with conventional substrates.

Since substrates for semiconductor packages according to selected embodiments of the invention exhibit maximum shielding capabilities at higher frequencies (e.g., around 6.6 GHz and 5 GHz), the substrates provided by selected embodiments of the invention can be advantageously applied to electronic devices having relatively high operational speeds.

Using the substrates for a semiconductor packages according to selected embodiments of the invention, EMI emissions can be effectively reduced.

The foregoing exemplary embodiments are teaching examples. Those of ordinary skill in the art will understand that various changes in form and details may be made to the exemplary embodiments without departing from the scope of the invention as defined by the following claims.

What is claimed:

1. A substrate for a semiconductor package, comprising:
a dielectric substrate;
a circuit pattern formed on a first surface of the dielectric substrate; and
an electromagnetic band gap (EGB) pattern comprising:
a plurality of unit structures formed on a second surface of the dielectric substrate opposite the first surface, each unit structure comprising:
a flat conductor electrically connected to the circuit pattern through a ground connection; and
a plurality of conductors having a zigzag pattern electrically connected to the flat conductor, wherein each of the plurality of conductors comprises:
a first pattern extending in an inward spiral direction from a first outer end to a first inner end;
a second pattern extending in an outward spiral direction, opposite the inward spiral direction, from a second inner end to a second outer end; and
a connecting portion connecting the first inner end and the second inner end,
wherein each flat conductor is electrically connected to a flat conductor of another one of the plurality of unit structures, and
wherein at least one of the plurality of conductors in each one of the plurality of unit structures is electrically connected to another one of the plurality of conductors.

2. The substrate of claim 1, wherein each of the plurality of conductors has a hexagonal shape.

3. The substrate of claim 2, wherein the first and second conductor patterns are repeated in three directions.

4. The substrate of claim 1, wherein the first pattern and the second pattern are parallel to each other.

5. The substrate of claim 1, wherein the dielectric substrate comprises a flexible nonconductive polymer film.

6. The substrate of claim 5, wherein the nonconductive polymer film comprises polyimide resin.

7. The substrate of claim 1, wherein the unit structures are repeated along two directions respectively, the two directions being perpendicular with respect to each other.

8. The substrate of claim 1, wherein each of the plurality of unit structures further comprises one or more meander structures.

9. The substrate of claim 1, wherein each the plurality of unit structures comprises the same pattern.

10. The substrate of claim 1, wherein the plurality of conductors are symmetrically arranged with reference to the flat conductor.

11. The substrate of claim 1, wherein the ground connection is electrically connected to a center portion of the flat conductor through via.

12. A substrate for a semiconductor package, comprising:
a dielectric substrate;
a circuit pattern formed on a first surface of the dielectric substrate; and
an electromagnetic band gap (EGB) pattern comprising:
a plurality of unit structures formed on a second surface of the dielectric substrate, each unit structure comprising:
a flat conductor electrically connected to the circuit pattern; and
a plurality of conductors having a zigzag pattern electrically connected to the flat conductor, wherein each of the plurality of conductors comprises:
a first pattern extending in an inward spiral direction from a first outer end to a first inner end;
a second pattern extending in an outward spiral direction, opposite the inward spiral direction, from a second inner end to a second outer end; and
a connecting portion connecting the first inner end and the second inner end, wherein the second surface is formed on an opposite side of the dielectric substrate from the first surface, and wherein each flat conductor is electrically connected to a flat conductor of another one of the plurality of unit structures.

13. A unit structure of an electromagnetic band gap (EGB) pattern formed on one surface of a dielectric substrate, opposite another surface of the dielectric substrate on which a circuit pattern is formed, the unit structure comprising:

a flat conductor electrically connected to the circuit pattern through a ground connection; and at least one conductor having a hexagonally shaped zigzag pattern electrically connected to the flat conductor, wherein the at least one conductor comprises:

a first pattern extending in an inward spiral direction from a first outer end to a first inner end;

a second pattern extending adjacent to the first pattern in an outward spiral direction, opposite the inward spiral direction, from a second inner end to a second outer end; and a connecting portion connecting the first inner end and the second inner end.

* * * * *